(12) United States Patent
Tran

(10) Patent No.: US 9,623,740 B1
(45) Date of Patent: Apr. 18, 2017

(54) VEHICLE SUNSHADE

(71) Applicant: Newton Tran, Las Vegas, NV (US)

(72) Inventor: Newton Tran, Las Vegas, NV (US)

(*) Notice: Subject to any disclaimer, the term of this patent is extended or adjusted under 35 U.S.C. 154(b) by 0 days.

(21) Appl. No.: 14/935,990

(22) Filed: Nov. 9, 2015

(51) Int. Cl.
*B60J 11/04* (2006.01)
*B60J 11/02* (2006.01)

(52) U.S. Cl.
CPC .......... *B60J 11/04* (2013.01); *B60J 11/02* (2013.01)

(58) Field of Classification Search
CPC ... B60J 11/00; B60J 11/02; B60J 11/04; B60J 11/06
USPC ....... 296/98, 99.1, 136.01, 136.04; 160/23.1, 160/25, 122, 379.22
See application file for complete search history.

(56) References Cited

U.S. PATENT DOCUMENTS

| | | | | |
|---|---|---|---|---|
| 3,050,075 A | * | 8/1962 | Kaplan | B60J 11/02 135/115 |
| 4,727,898 A | * | 3/1988 | Guma | B60J 11/02 135/87 |
| 5,230,545 A | | 7/1993 | Huang et al. | |
| 6,705,664 B1 | | 3/2004 | Lahutsky | |
| 7,237,826 B2 | * | 7/2007 | Sagi | B60R 9/055 220/4.12 |
| 8,366,172 B1 | | 2/2013 | Morazan | |
| 2004/0135393 A1 | * | 7/2004 | Neuer | B60J 7/165 296/136.1 |
| 2009/0038766 A1 | | 2/2009 | Smith, Jr. | |

FOREIGN PATENT DOCUMENTS

WO    WO2005039913    *    5/2005

* cited by examiner

*Primary Examiner* — Dennis H Pedder
(74) *Attorney, Agent, or Firm* — Lightbulb IP, LLC

(57) ABSTRACT

A vehicle sunshade comprises an enclosure housing one or more shades for covering or shading a vehicle. The enclosure is typically mounted to a portion of a vehicle to allow the vehicle sunshade to travel with the vehicle and be used anywhere. The enclosure may also be tapered and comprise one or more doors that cover the shades therein. A shade may be mounted on a roller with a biasing mechanism for automatically retracting or extending the shade. One or more flaps can be attached to the shade to extend coverage of a vehicle.

13 Claims, 5 Drawing Sheets

VEHICLE SUNSHADE

BACKGROUND OF THE INVENTION

Field of the Invention

The invention relates to sunshades and in particular to a vehicle sunshade that is mounted to a vehicle.

Related Art

A variety of sunshades for vehicles exist for blocking sunlight. These include foldable or roll-up windshield sunshades. In addition, some vehicles include sunshades deployed from one or more window sills. Moreover, various vehicle coverings which block sunlight exist. These include shade structures, garages and the like.

These traditional sunshades do not provide adequate protection, leaving a substantial portion of a vehicle unshaded. In addition, traditional sunshades are typically deployed within a vehicle's interior, which allows heat and solar radiation to enter the vehicle. The traditional sunshades that shade a larger portion of a vehicle, such as shade structures or garages are stationary and cannot be used when the vehicle is parked at a remote location.

A number of vehicle mounted sunshades also exist. While these can move with the vehicle, they are also complex and cumbersome to deploy and unsightly, among other things. From the discussion that follows, it will become apparent that the present invention addresses the deficiencies associated with the prior art while providing numerous additional advantages and benefits not contemplated or possible with prior art constructions.

SUMMARY OF THE INVENTION

A vehicle sunshade is disclosed herein. The vehicle sunshade is advantageous in that it provides cover or shading for a vehicle while also being convenient to deploy and store. This is because the vehicle sunshade may be attached to or integrally formed into the roof (or other portion) of a vehicle. In this manner, the vehicle sunshade can be easily and conveniently used to provide a cover or shade wherever the vehicle is located. The vehicle sunshade also is designed to have an aerodynamic and compact shape.

Various embodiments of the vehicle sunshade are disclosed herein. For example, in one embodiment the vehicle sunshade comprises an enclosure tapered at one or both of its sides, one or more compartments within the enclosure, and one or more mounts attached to the enclosure and within the compartments. A roller is rotatably mounted to each of the mounts, and a shade is carried by each roller. A door is at an opening of each the compartments. Each door opens to permit access to the shade in each of the compartments.

The vehicle sunshade may also include a biasing device engaged to each roller, such as to cause the roller to automatically roll up the shade by rotating the roller. A stop may be at a distal end of each shade. Also, one or more openings may be in a bottom of the enclosure. It is noted that the taper may be a curved taper. Each shade may have an indented crease. In addition, each shade may comprise a flap foldable along the indented crease.

In another exemplary embodiment, the vehicle sunshade comprises a support comprising a top and one or more rollers, one or more mounts rotatably securing the rollers to the support, and a shade on each of the rollers. A base comprising a bottom and two tapered sides is also included, along with a biasing device engaged to the support and the base biased toward pushing the support to a raised position relative to the base.

A stop may be at a distal end of each of the shades. A post may extend from the base and a slot in the support that accepts the post, wherein the biasing device extends from the post and into the slot. Also, a latching mechanism that engages to hold the support in a lowered position may be provided. One or more openings may be in the bottom of the base. Similar to the above embodiment, each shade may include an indented crease. Also, each shade may comprise a flap foldable along the indented crease.

Various methods for shading or covering a vehicle are also disclosed herein. In one exemplary embodiment a method of shading a vehicle with a vehicle sunshade is disclosed, with such method comprising securing the vehicle sunshade to the vehicle, the vehicle sunshade comprising a tapered enclosure having a first side and a second side, opening a first door of a first compartment at the first side of the vehicle sunshade, and extending a first sunshade by unrolling the first sunshade from a first roller within the first compartment. It is noted that the enclosure may have a curved taper.

The method also includes securing a distal end of the first sunshade to a front end of the vehicle, opening a second door of a second compartment of the second side of the vehicle sunshade, and extending a second sunshade by unrolling the second sunshade from a second roller within the second compartment.

The first sunshade may be unfolded along a crease in the first sunshade such that a flap of the first sunshade covers a side of the vehicle once the first sunshade is unfolded. Likewise, the second sunshade may be unfolded along a crease in the second sunshade such that a flap of the second sunshade covers a side of the vehicle once the second sunshade is unfolded. Also, the first sunshade, the second sunshade or both may be retracted so that it is rolled back onto the first roller.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the vehicle sunshade provides a sunshade the blocks or reduces a vehicle's exposure to sunlight. This is advantageous in that it protects the vehicle's exterior from deterioration, infrared and ultraviolet rays and other harsh elements of sunlight. In addition, the vehicle sunshade reduces the amount sunlight heats the vehicle's exterior and interior.

Figure 1:
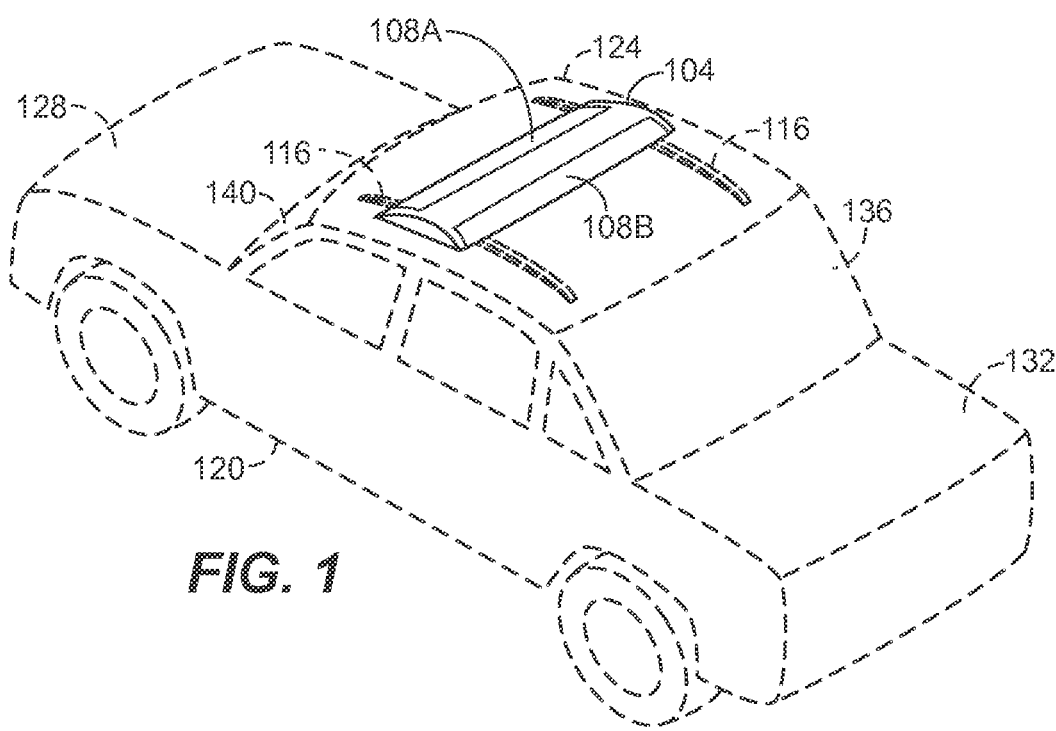
FIG. 1 is a top perspective view of an exemplary vehicle sunshade.

Referring to FIG. 1, which illustrates an exemplary vehicle sunshade 104 mounted on a vehicle 120, it is typical for the vehicle sunshade 104 to be mounted to a vehicle 108 when in use. This is advantageous in that it allows the vehicle sunshade 104 to accompany the vehicle 108 wherever the vehicle travels. Unlike traditional sunshades however, the vehicle sunshade 104 herein has an aerodynamically shaped enclosure 112 as well as a particular deployment mechanism 116 that makes deploying and retracting a sunshade quick and convenient.

The vehicle sunshade 104 may be mounted to the roof 124 of a vehicle 120. The vehicle sunshade 104 may be directly attached to a vehicle 120, or be attached via one or more mounts. As shown in FIG. 1 for example, the vehicle sunshade 104 is attached to roof rails 116 at the vehicle's roof 124. It is noted that the vehicle sunshade 104 may be attached to roof racks or other vehicle accessories. In addition, the vehicle sunshade 120 may be attached to the hood 128, trunk 132 or other surface of a vehicle 120 as well. It is contemplated that the vehicle sunshade 120 may be angled parallel to the lateral axis of a vehicle, such as shown in FIG. 1, or perpendicular to the lateral axis, or at various other angles.

Figure 2:
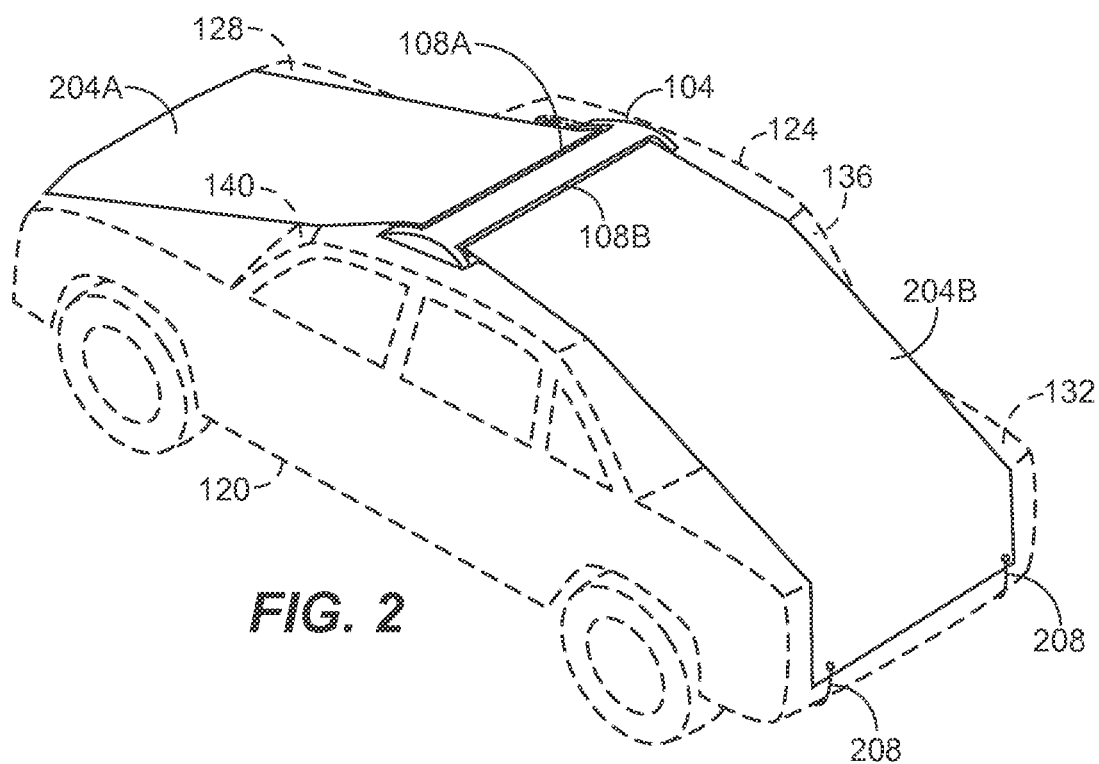
FIG. 2 is a top perspective view of an exemplary vehicle sunshade in a deployed state.

As can be seen, the vehicle sunshade 104 may comprise one or more doors 108A, 108B which open and close to provide access or house one or more shades within the vehicle sunshade. FIG. 2 illustrates an exemplary embodiment of the vehicle sunshade 104 in a deployed state. As can be seen, the doors 108A, 108B have been opened to allow a first shade 104A and a second shade 204B to be deployed over the vehicle 120.

The first and second shades 104A, 104B will typically be extended to cover a substantial portion of the vehicle 120. As can be seen from FIG. 2, the first shade 204A extends over the roof 124, windshield 140 and hood 128 of the vehicle 120, while the second shade 204B extends over the roof, rear window 136 and trunk 132 of the vehicle. This provides shade to these parts of the vehicle reducing sun exposure and heat to their associated compartments and components. One or more fasteners 208 may be provided at a distal end of a shade 204A, 204B to secure the shade to the vehicle. Some exemplary fasteners 208 include clips, hooks, clamps, bungees, cords, and the like. A corresponding hook or other structure may be attached to the vehicle to engage one or more fasteners 208 of a shade 204A, 204B.

Figure 3:
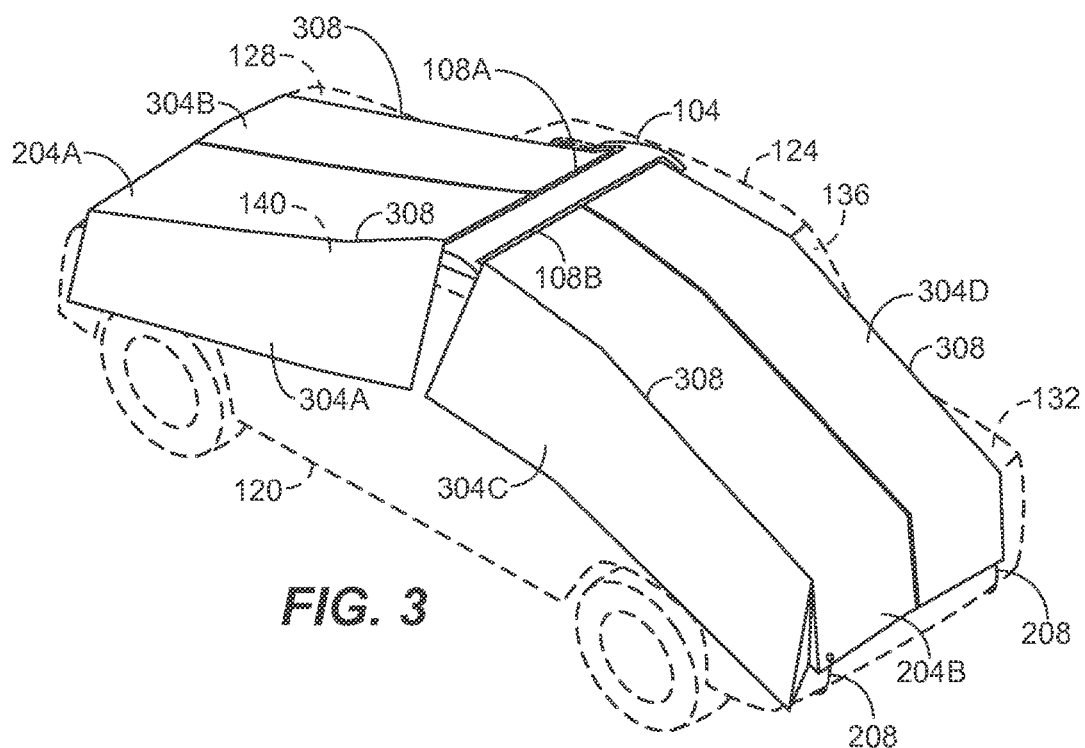
FIG. 3 is a top perspective view of an exemplary vehicle sunshade in a deployed state.

As can be seen from FIG. 3, the vehicle sunshade 104 may include one or more multi-part shades 204A, 204B. A multi-part shade 204A, 204B may provide additional coverage to further protect a vehicle 120. For instance, a multi-part shade 204A, 204B may comprise one or more flaps 304A, 304B, 304C, 304D that fold out to cover the sides or other areas of a vehicle 120. As shown in FIG. 3, a first and second flap 304A, 304C have been extended to cover the side of the vehicle 120.

A flap 304A, 304B, 304C, 304D may be folded and unfolded at a crease 308. As can be seen from FIG. 3, a third and forth flap 304B, 304D have not yet been unfolded, but may be unfolded if desired at their respective creases 308. It is contemplated that a crease 308 may formed by a user folding a shade 204A, 204B. Alternatively, a crease 308 may comprise one or more indentations, depressions or other structures formed into a shade 204A, 204B to help ensure that the shade folds at the same location for storage or deployment. When no longer in use, the flaps 304A, 304B, 304C, 304D may be folded inward to allow a shade 204A, 204B to retract into the vehicle sunshade's housing.

Figure 4:
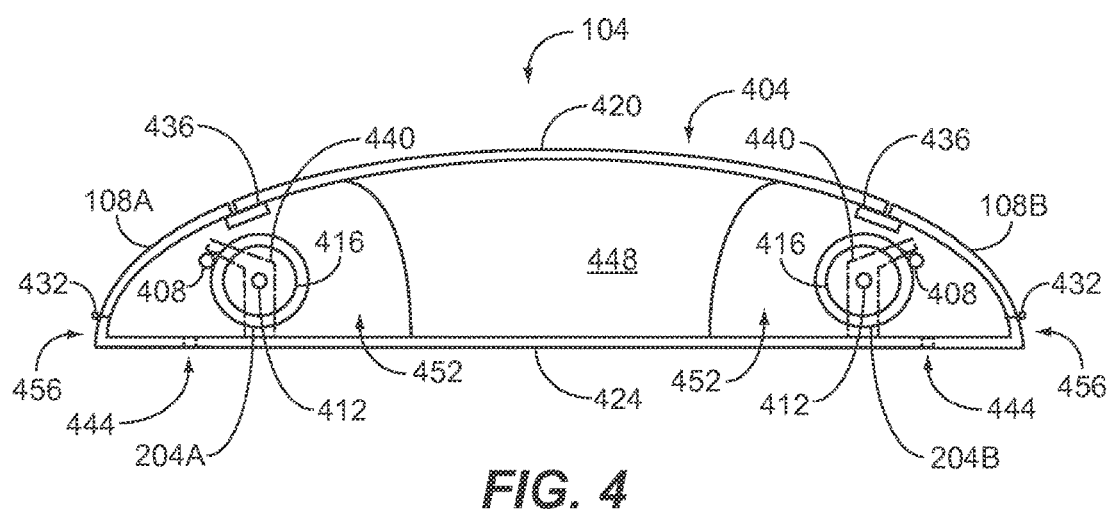
FIG. 4 is a cross-sectional view of an exemplary vehicle sunshade.

FIG. 4 provides a cross-sectional view of an exemplary vehicle sunshade 104. As can be seen, the vehicle sunshade 104 may comprise an enclosure or housing 404. A housing 404 may comprise a bottom 424, top 420 and one or more sides 456. One or more doors 108A, 108B may be at the sides 456. The vehicle sunshade 104 may also include one or more structural components or members 448 that secures or supports the bottom 424, top 420 and other components of the vehicle sunshade 104. A structural member 448 may also reinforce the vehicle sunshade or various portions thereof.

In one or more embodiments, the vehicle sunshade may comprise one or more compartments 452 which hold a shade 204. Typically a shade 204A will be on a roller 416 such that the shade can be deployed, such as shown in FIG. 2, by rolling the shade off the roller, and retracted, such as shown in FIG. 1, by rolling the shade back onto the roller. One or more axles 412 may support a roller 416 while allowing it to rotate. One or more springs, motors or other biasing devices may engage a roller 416, its axle 412 or both, to bias a shade to a rolled up or retracted state.

A mount 440 may be provided to support the axle 412, and accordingly also support a roller 416 and shade 204A, 204B. Typically, a mount 440 will be attached to a portion of the housing 404, support member 448 or both. As can be seen in FIG. 4 for example, the mounts 440 extend upward from a bottom 424 of the housing 404.

A stop 408 may be at the distal end of a shade 204A, 204B to prevent a roller 416 and its biasing mechanism from rolling a shade 204A, 204B back beyond a certain point. A stop 408 may engage a portion of a mount 440 or other structure to prevent the roller 416 from rolling the shade 204A, 204B beyond a certain point. In FIG. 4 for example, the stop 408 engages a portion of the mount 440 to stop the roller's rolling. It is noted that the stop 408 may be engaged at a location convenient for a user to reach the shade 204A, 204B. In FIG. 4 for example, the stop 408 is engaged near a door 108A, 108B of the vehicle sunshade 104, such that a user can easily access the shade 204A, 204B when the door is open.

A door 108A, 108B is generally provided to provide access to the one or more shades 204A, 204B, while also allowing the shades to be enclosed when not in use. A door 108A, 108B may open and close in various ways. For example, one or more pivots, hinges 432 or the like may rotatably secure a door 108A, 108B. Alternatively or in addition, a door 108A, 108B may be completely removable held in place by a friction fit. One or more magnetic, mechanical or other latches 436 may be provided to secure a door 108A, 108B in a closed position. Once a door 108A, 108B is closed, a compartment 452 and components therein will typically be enclosed so as to protected them from exposure to the environment, including to rain, dirt, or other undesirable elements.

As can be seen, a housing 404 may have an aerodynamic shape so as to reduce or eliminate wind resistance. This helps to ensure that a vehicle's fuel consumption is not affected by the vehicle sunshade 104. Various shapes may be used, but typically at least one side 456 of the housing 404 will be tapered such as to pierce through the air when in motion. In FIG. 4 for example, both sides 456 of the housing 404 are rounded and tapered. It is contemplated that a housing 404 may have a distinctly tapered/shaped ends in one or more embodiments.

As described briefly above, the vehicle sunshade 104 may be secured to a vehicle in various ways. In one or more embodiments, one or more mounting points 444 may be provided to secure the vehicle sunshade 104. A mounting point 444 may comprise an opening, such as shown in FIG. 4, that accepts one or more fasteners, such as screws, pins or the like. Typically, the location of one or more mounting points 444 will correspond to mounting points on a vehicle. Alternatively, a plurality of mounting points 444 may be provided to allow the vehicle sunshade 104 to be attached to a variety of vehicles, vehicle roof rails, vehicle roof racks or other mounting structures. It is contemplated that the vehicle sunshade 104 may be also or alternatively be attached by clips, clamps, adhesive, suction cups, magnets or other fastening mechanisms.

Though shown as having two compartments 452 having shades 204A, 204B therein, it is contemplated that only one compartment and shade may be provided in some embodiments. Since shades 204A, 204B of various lengths may be used it is contemplated that a single shade may extend over substantially the entire length of a vehicle. For example, a vehicle sunshade 104 may be installed at the trunk or hood of a vehicle and its shade 204A, 204B may extend to the opposite end of the vehicle.

Figure 5:
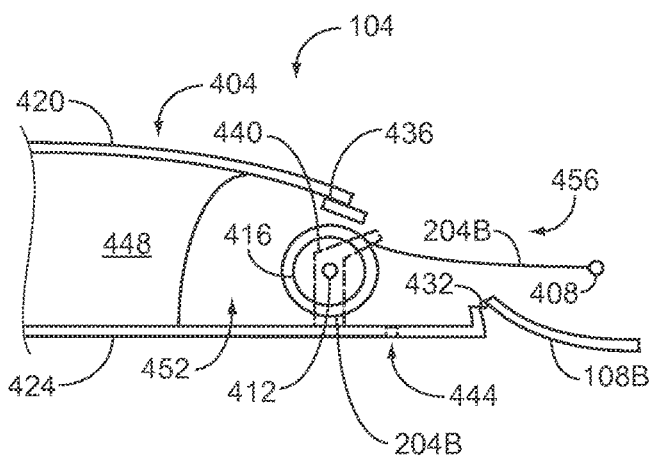
FIG. 5 is a cross-sectional view of an exemplary vehicle sunshade in a deployed state.

FIG. 5 illustrates one side 456 of an exemplary vehicle sunshade 104 with its door 108B open to permit access to a shade 204B. Such access allows the shade 204B to be drawn out from its compartment 452. In addition, access to a shade 204B also permits the shade to be removed, replaced or repaired. For example, a shade 204B may be removed from its mount 440 such as by disconnecting its axle 412 from the mount. A shade 204B may be installed by reconnecting, inserting or otherwise engaging its axle 412 to the desired mount 440.

Though shown as just exiting the compartment, it will be understood that a shade 204B may be deployed to various lengths, such as disclosed above. Once a shade 204B is no longer desired, it may be retracted into its compartment 452 through its door's opening. Thereafter, the shade's door 108B may be closed to enclose the compartment 452, such as shown in FIG. 4.

Figure 6:
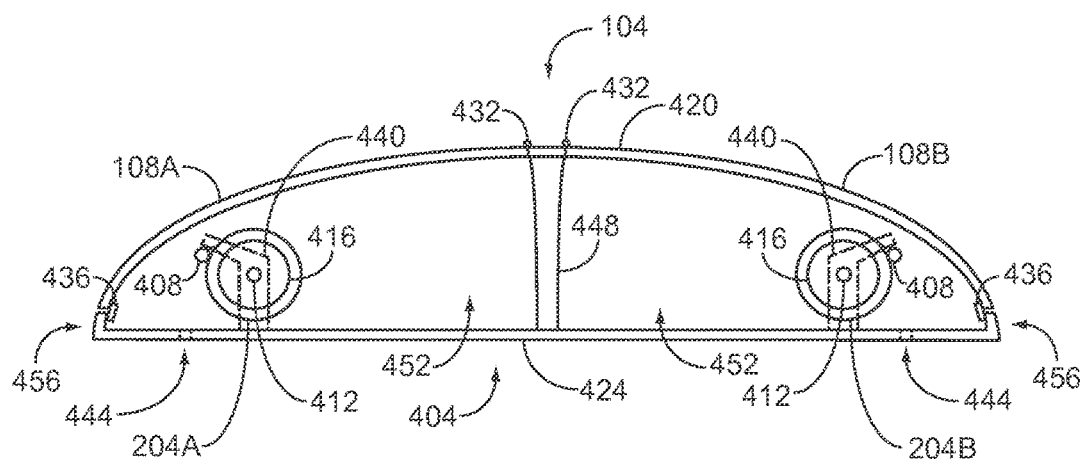
FIG. 6 is a cross-sectional view of an exemplary vehicle sunshade.

Various embodiments of the vehicle sunshade 104 are contemplated. For instance, FIG. 6 illustrates an alternate embodiment of the vehicle sunshade 104. As can be seen, the hinges 436 and doors 108A, 108B are configured to rotate upward to open a compartment 452. This is in contrast to the embodiment of FIG. 4 where the doors 108A, 108B rotate downward to open a compartment 452. It is contemplated that, after a shade 204A, 204B is deployed its corresponding door 108A, 108B may be closed down onto the shade such as to enclose the its compartment 452. Closing a door 108A, 108B in this manner also prevents dirt, insects or other undesired items from entering a compartment 452 even after a sunshade 204A, 204B is deployed.

Figure 7:
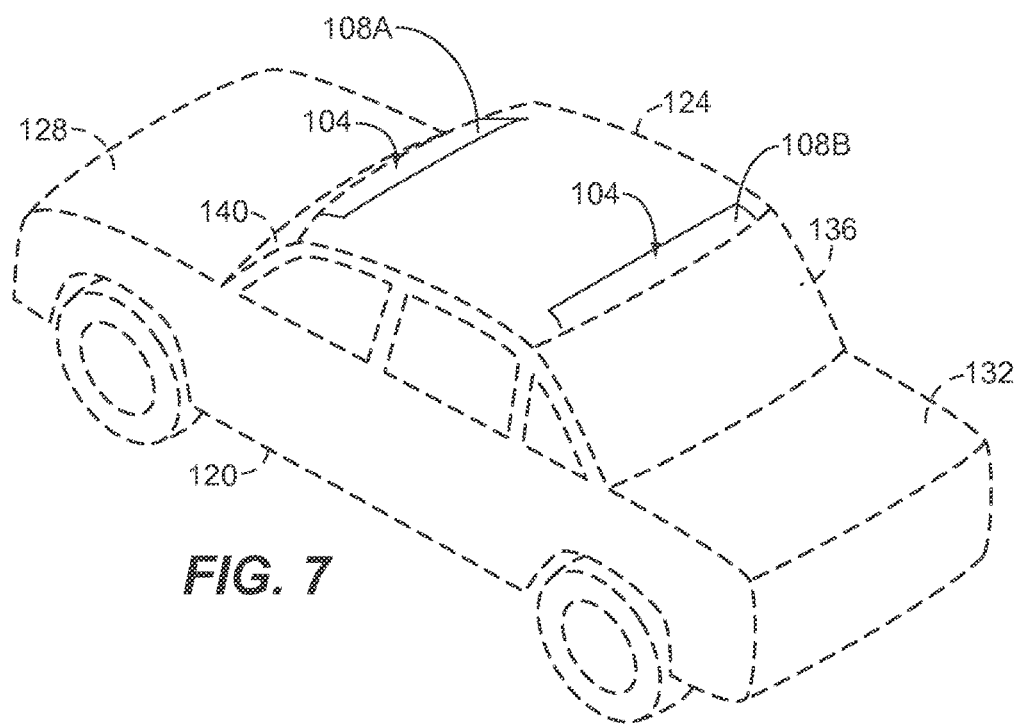
FIG. 7 is a top perspective view of an exemplary vehicle sunshade integrated into a vehicle.

FIG. 7 illustrates another exemplary embodiment of the vehicle sunshade 104. As can be seen, a housing of the vehicle sunshade may be formed by a portion of the vehicle 120. As shown in FIG. 7 for example, the roof 124 forms the housing for a vehicle sunshade 104. A compartment, such as those disclosed above may be behind each of the doors 108A, 108B attached to the roof 124. The doors 108A, 108B may be opened to deploy the shades therein. The doors 108A, 108B may be closed, such as shown in FIG. 7 to enclose the shades and compartments.

Figure 8:
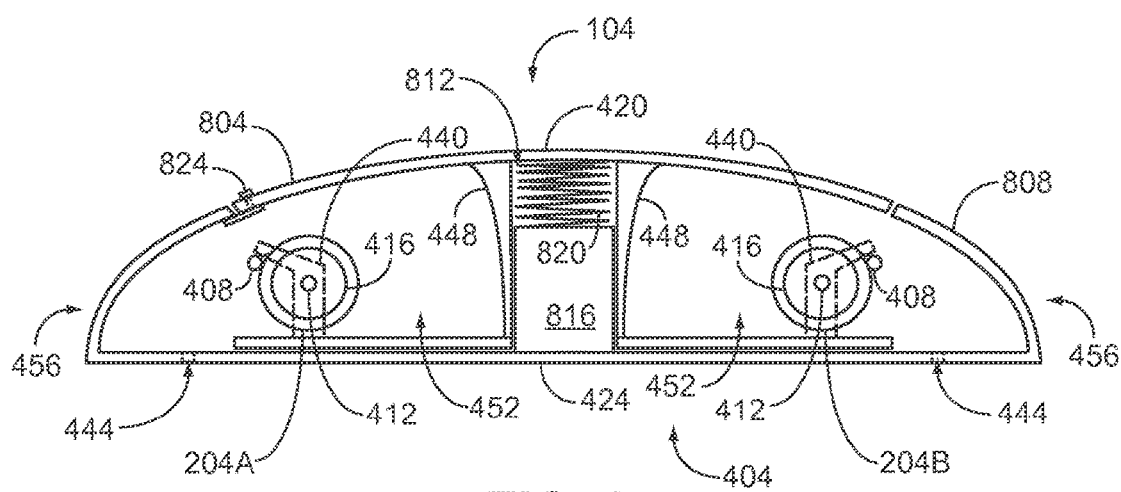
FIG. 8 is a cross-sectional view of an exemplary vehicle sunshade in a lowered state.
Figure 9:
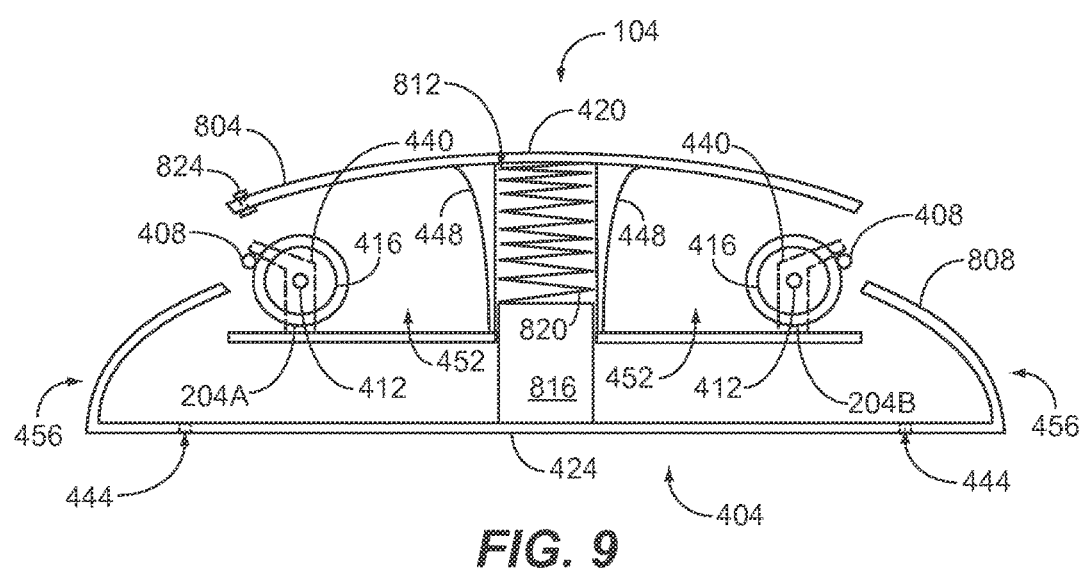
FIG. 9 is a cross-sectional view of an exemplary vehicle sunshade in a raised state.

FIGS. 8-9 illustrate yet another exemplary embodiment of the vehicle sunshade 104 whereby a support 804 may be raised and lowered relative to a base 808 of the vehicle sunshade. FIG. 8 illustrates the vehicle sunshade in a lowered state, while FIG. 9 illustrates the vehicle sunshade in a raised state. As can be seen, one or more shades 204A, 204B may be accessed when the vehicle sunshade is in a raised state. As stated above, access to the one or more shades 204A, 204B also allows the shades be removed, repaired or replaced (as well as deployed) in this state.

A rotatable latch 824 may hold the support 804 in the lowered position. As can be seen from FIG. 9, the latch 824 may be rotated to disengage the support from the base thereby allowing the support to be raised. It is contemplated that other mechanisms may be used to hold the support 804 in the lowered position. For example, a push to release mechanism may be used. Alternatively or in addition one or more magnets may hold the support 804 in the lowered position. It is contemplated that a popup or other handle, such as at the top 420 of the support 804, may be provided to allow a user to lift the support 804 from the lowered position.

One or more guides may be provided to control the vertical and lateral movement of the support 804 as it moves to and from the raised and lowered positions. This ensures that the support 804 and body 808 remain aligned with one another even as they move relative to one another. As shown in FIG. 8 for example, a guide comprising a post 816 and a corresponding slot 812 is provided. The post 816 is secured to the bottom 424 of the base 808, while the slot 812 is formed in a support member 448 of the support 804.

As can be seen from FIG. 9, the post 816 may move into and out of the slot 812 to allow the support to be raised and lowered. Typically, the post 816 and slot 812 will have corresponding non-circular cross sectional shapes to prevent the support 804 from rotating relative to the base 808 when it is being raised or lowered or at the raised or lowered positions. Some exemplary non-circular shapes for the cross sections include a square, triangle, rectangle, hexagon, etc. . . . .

In one or more embodiments, a biasing mechanism 820, such as a spring may be provided to bias the support towards the raised position. A biasing mechanism 820 may engage both a portion of a support 804 and a portion of a base 808 to exact a force that biases the support away from the base. As shown in FIGS. 8-9 for example, the biasing mechanism 820 extends between the post 816 and the top 420 of the support 804. This allows the biasing mechanism 820 to push the support away from the base 808.

Referring to FIG. 9, once the support 804 is in the raised state, one or more shades 204A, 204B may be accessed, such as to deploy the shades to shade or cover a vehicle. As can be seen, raising the support 804 creates an opening in the housing 404 which allows a user to pull out the shade 204A, 204B. Once no longer required or desired, a shade 204A, 204B can be rolled back onto its roller 416. The support 804 can then be lowered and latched or otherwise held in the lowered state to enclose the compartments 452 to protect the shades 204A, 204B and other internal components of the vehicle sunshade 104 from the elements.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A vehicle sunshade comprising:
   a support comprising one or more mounts;
   one or more rollers rotatably mounted to the one or more mounts;
   one or more shades on the one or more rollers;
   a base having at least one tapered side;
   a guide comprising a post and a slot, the guide extending between the base and the support; and
   a biasing device extending between the base and the support biased toward pushing the support to a raised position relative to the base.

2. The vehicle sunshade of claim 1 further comprising one or more biasing devices engaged to the one or more rollers.

3. The vehicle sunshade of claim 1 further comprising a stop at a distal end of the one or more shades.

4. The vehicle sunshade of claim 1 further comprising one or more openings in a bottom of the base.

5. The vehicle sunshade of claim 1, wherein the at least one tapered side has a curved taper.

6. The vehicle sunshade of claim 1, wherein the one or more shades comprise a crease.

7. The vehicle sunshade of claim 6, wherein the one or more shades comprise a flap foldable along the crease.

8. A vehicle sunshade comprising:
   a support comprising a top and one or more rollers;
   one or more mounts rotatably securing the one or more rollers to the support;
   one or more shades on the one or more rollers;
   a base comprising a bottom and two tapered sides;
   a post extending from the base and a slot in the support that accepts the post;
   a biasing device extending between the post and into the slot and biased toward pushing the support to a raised position relative to the base.

9. The vehicle sunshade of claim 8 further comprising a stop at a distal end of the one or more shades.

10. The vehicle sunshade of claim 8 further comprising a latching mechanism that engages to hold the support in a lowered position.

11. The vehicle sunshade of claim 8 further comprising one or more openings in the bottom of the base.

12. The vehicle sunshade of claim 8, wherein the one or more shades comprise a crease.

13. The vehicle sunshade of claim 8, wherein the one or more shades comprise a flap foldable along the crease.

* * * * *